(12) United States Patent
Wallace et al.

(10) Patent No.: US 7,644,215 B2
(45) Date of Patent: Jan. 5, 2010

(54) METHODS AND SYSTEMS FOR PROVIDING MANAGEMENT IN A TELECOMMUNICATIONS EQUIPMENT SHELF ASSEMBLY USING A SHARED SERIAL BUS

(75) Inventors: Robert L. Wallace, Apex, NC (US); Thomas L. Bonds, Jr., Raleigh, NC (US); Gary Conly Messer, Raleigh, NC (US); Donald Wayne Prather, Raleigh, NC (US); Phillip C. Jerzak, Raleigh, NC (US)

(73) Assignee: Tekelec, Morrisville, NC (US)

( * ) Notice: Subject to any disclaimer, the term of this patent is extended or adjusted under 35 U.S.C. 154(b) by 385 days.

(21) Appl. No.: 11/272,478

(22) Filed: Nov. 10, 2005

(65) Prior Publication Data

US 2006/0129731 A1 Jun. 15, 2006

Related U.S. Application Data

(60) Provisional application No. 60/626,801, filed on Nov. 10, 2004.

(51) Int. Cl.
*G06F 13/00* (2006.01)
*H05K 7/10* (2006.01)

(52) U.S. Cl. .................. 710/301; 710/300; 710/316; 710/317

(58) Field of Classification Search ............... 710/301, 710/316, 317, 300
See application file for complete search history.

(56) References Cited

U.S. PATENT DOCUMENTS

| | | | | |
|---|---|---|---|---|
| 6,052,456 A | * | 4/2000 | Huang | ......... 379/201.04 |
| 6,622,206 B1 | | 9/2003 | Kanamaru et al. | |
| 6,915,362 B2 | * | 7/2005 | Ramsey et al. | ............. 710/62 |
| 7,266,627 B2 | * | 9/2007 | DeNies et al. | ............. 710/301 |
| 2006/0105591 A1 | | 5/2006 | Bonds, Jr. et al. | |
| 2006/0123161 A1 | | 6/2006 | Wallace et al. | |

OTHER PUBLICATIONS

PCI Industrial Computers Manufacturers Group, Advanced TCA PICMG 3.0 Short Form Specification, pp. 1-33, Jan. 2003.

"The $I^2C$-bus and how to use it (including specifications)," Phillips Semiconductors, pp. 3.3-3.26, Apr. 1995.

(Continued)

*Primary Examiner*—Mark Rinehart
*Assistant Examiner*—Jeremy S Cerullo
(74) *Attorney, Agent, or Firm*—Jenkins, Wilson, Taylor & Hunt, P.A.

(57) ABSTRACT

A method for connecting an externally accessible shared serial port to one of a plurality of target serial ports is provided. The target serial ports are associated with a plurality of different application cards within a shelf assembly. The method includes receiving, from an external device connected to an externally accessible shared serial port, a request for a connection between the externally accessible shared serial port and one of a plurality of target serial ports within a shelf assembly associated with a plurality of different application cards, and determining whether shelf resources are available to connect the externally accessible shared serial port to the requested target serial port. In response to determining that shelf resources are available, the externally accessible shared serial port is connected to the requested target serial port.

24 Claims, 4 Drawing Sheets

OTHER PUBLICATIONS

Commonly-assigned, co-pending U.S. Appl. No. 11/282,958 for "Methods and Systems for Buffering Console Port Data in a Telecommunications Equipment Shelf Assembly," (Unpublished, Nov. 18, 2005).

Notice of Abandonment and Interview Summary for U.S. Appl. No. 11/282,958 (Jul. 10, 2008).

Non-Final Office Action for U.S. Appl. No. 11/282,958 (Oct. 31, 2007).

* cited by examiner

METHODS AND SYSTEMS FOR PROVIDING MANAGEMENT IN A TELECOMMUNICATIONS EQUIPMENT SHELF ASSEMBLY USING A SHARED SERIAL BUS

RELATED APPLICATIONS

This application claims the benefit of U.S. Provisional Patent Application Ser. No. 60/626,801, filed Nov. 10, 2004, the disclosure of which is incorporated herein by reference in its entirety.

TECHNICAL FIELD

The subject matter described herein relates to managing electronic-circuit cards residing in electronic equipment enclosures. More particularly, the subject matter described herein relates to methods and systems for providing management communications between electronic circuit cards in a telecommunications equipment shelf assembly and an off-shelf management entity.

BACKGROUND ART

It is well known to arrange telecommunications equipment in shelf assemblies. In some shelf assemblies, circuit cards are removably connected to a backplane or midplane. The circuit cards may be arranged in parallel to one another and may be guided to be perpendicular to the backplane or midplane. Electrical connections are established between connectors on the backplane or midplane and complementary connectors on the back edge of each circuit card. Typically, the connectors include multiple pins and sockets arranged in one or more rows along part or all of the back edge of the circuit card. When a circuit card is inserted into the equipment shelf, the shelf guides provide an approximate alignment for the pins and sockets, and a precise alignment is achieved by the mating portions of the connectors.

The backplane or midplane typically provides power to each circuit card, as well as electrical interconnections between circuit cards. The electrical signal assigned to each connector pin is left to the designer of the card and chassis to decide. Thus, various connector pin-outs have been developed, both industry standard and proprietary. The PCI Industrial Computer Manufacturers Group (PICMG) 3.0 specification defines an open architecture whereby circuit cards from different manufacturers can interoperate within a shelf assembly. The PICMG specification defines the pinout and function of the various connectors used to connect a circuit card to the midplane of a shelf assembly.

FIG. 1 is a perspective view of the basic elements of a PICMG 3.0 compliant card assembly platform. In FIG. 1, front board 101 contains the electrical components required to perform a desired function or application and has connectors required to interface with a shelf midplane 103. The PICMG standard defines three connector zones on front board 101. Zone 1 provides power connection and shelf management, Zone 2 provides the data transport interface, and Zone 3 permits a user defined input/output interconnect. Midplane 103 has connector interfaces for the Zone 1 and Zone 2 connectors on the front board 101, as well as mechanical alignment and support. Rear transition module 105 provides user defined input and output connectivity between the Zone 3 connector on the front board 101 and external systems or devices.

Shelf assemblies permit the deployment of several application cards in a comparatively small space. In many shelf architectures, a shelf management interface card is provided to monitor shelf status and provide the ability to manage cards within the shelf, for example by relaying network management queries and responses between a system manager and an application card. A common network management protocol is Simple Network Management Protocol (SNMP), which typically uses TCP/IP for transport. Thus, in order for the application card to receive and respond to SNMP queries, the application card must be functioning at a level that permits communication at a higher-level protocol. For example, the operating system on an application card must generally be operational to implement SNMP or another application level management protocol. When a card fails on booting up, the operating system may not be available. As a result, application level management functions are typically not available.

In order to provide diagnostic and management connectivity when application level management capabilities are not available, application cards have typically included a dedicated serial port to permit configuring and debugging the application card when the application card is not capable of supporting a higher level protocol. This dedicated serial port is referred to as a console port. The console port is generally accessible through rear transition module 105 using a suitable connector. Requiring a dedicated console port on each card increases the cost of electronic equipment assemblies when the assemblies have multiple cards. In addition, the time and equipment required to diagnose card failures is increased since the console port on each card must be accessed in order to monitor data being sent from each card.

Accordingly, there exists a need for improved methods and systems for providing diagnostic and management connectivity to application cards in electronic equipment assemblies having multiple application cards.

DISCLOSURE OF THE INVENTION

In accordance with one aspect of the subject matter described herein, a method for connecting an externally accessible shared serial port to one of a plurality of target serial ports is provided. The target serial ports are associated with a plurality of different application cards within a shelf assembly. The method includes receiving, from an external device connected to an externally accessible shared serial port, a request for a connection between the externally accessible shared serial port and one of a plurality of target serial ports within a shelf assembly associated with a plurality of different application cards, and determining whether shelf resources are available to connect the externally accessible shared serial port to the requested target serial port. In response to determining that shelf resources are available, the externally accessible shared serial port is connected to the requested target serial port.

DETAILED DESCRIPTION OF THE INVENTION

The subject matter described herein provides improved methods and systems for providing diagnostic card management connectivity to a plurality of application cards in a shelf assembly using a shared serial management interface. The shared serial management interface may be provided on a shelf management card and may be accessible to an external manager. The shelf management card interacts with an application card at a level that does not require the operating system on the card to be operational. For example, the management card may provide diagnostic and management connectivity to the application cards during boot up and during or after an operating system failure.

Figure 1:
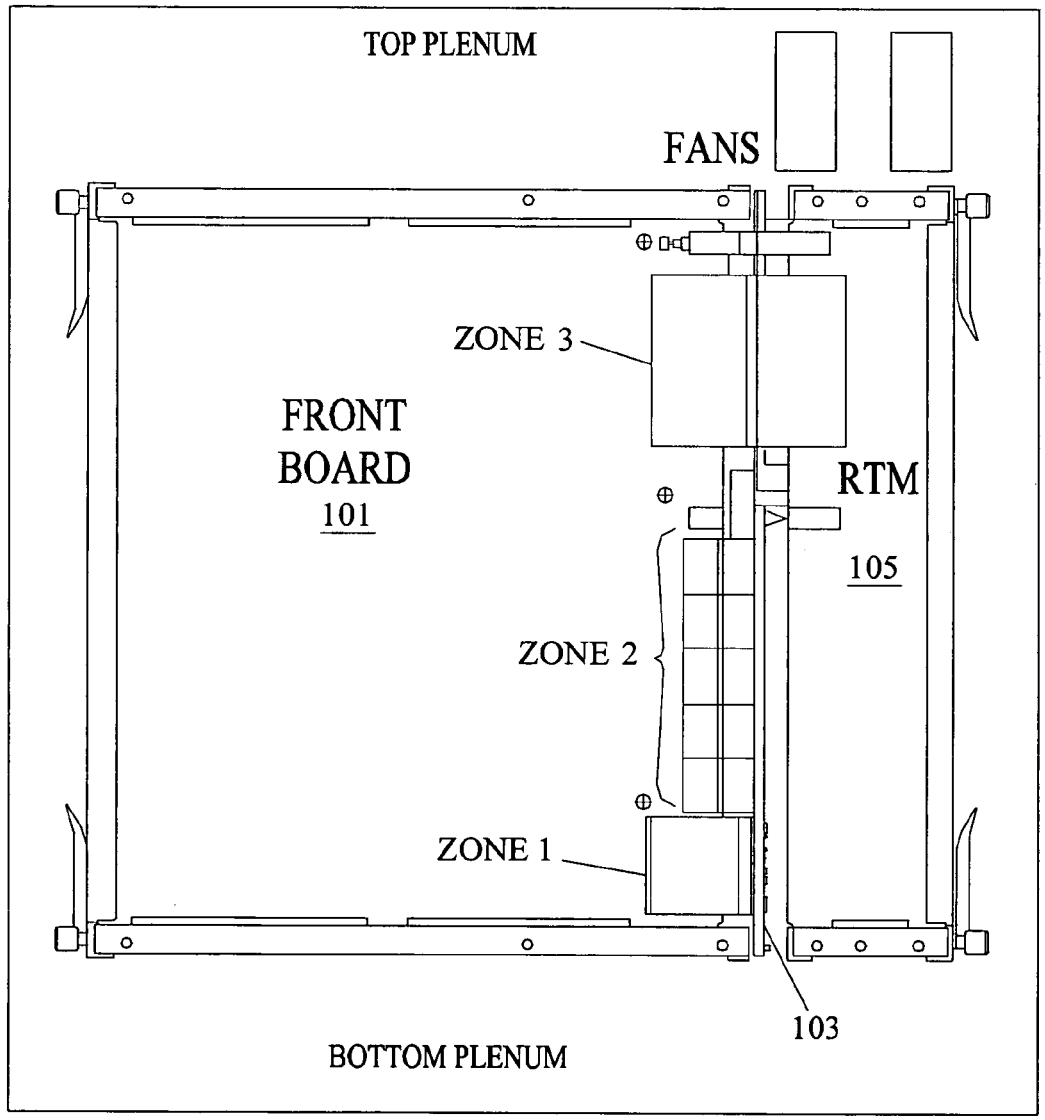
FIG. 1 is a perspective view of the basic elements of a PICMG 3.0 compliant platform.
Figure 2:
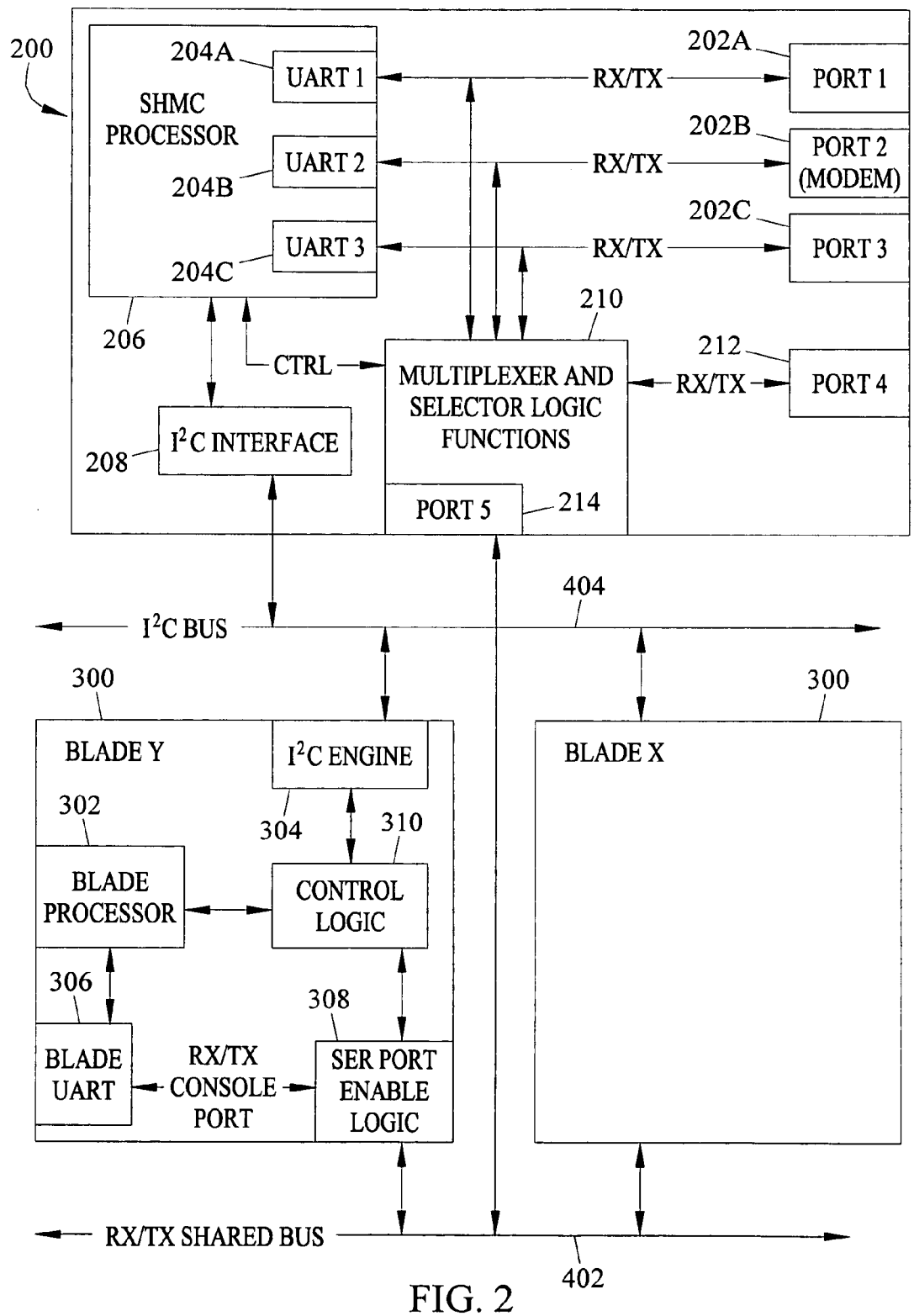
FIG. 2 is a block diagram of a shelf assembly having a shared serial management interface in accordance with an aspect of the subject matter described herein.

FIG. 2 is a block diagram of a shelf assembly having a shared serial management interface in accordance with an aspect of the subject matter described herein. Shelf management card 200 includes one or more external management ports 202A, 202B, and 202C that may be used to interface with an external manager, a corresponding number of universal asynchronous receiver transmitters (UARTs) 204A, 204B, and 204C, a shelf management control processor 206, a shelf management interface 208, multiplexer and selector logic 210, a rack control interface 212, and a shared serial bus interface 214.

In FIG. 2, three external management ports 202A, 202B, and 202C are shown. External management ports 202A and 202C may provide a direct terminal interface, while external management port 202B may provide connectivity through a dedicated modem. Each external management port 202A, 202B, and 202C may interface with a respective UART 204A, 204B, and 204C and may include circuitry needed to convert the interface signals to a format and level compatible with the UARTs 204A, 204B, and 204C. For example, external management ports 202A and 202C may include circuitry to convert the terminal interface signals from one voltage level, such as that used by serial interface standards such as EIA/TIA-232, to a voltage level compatible with the corresponding UART 204A and 204C. Similarly, external management port 202B may include circuitry, such as a modulator/demodulator, to convert encoded data received from the public switched telephone network (PSTN) to a serial bit stream.

UARTs 204A, 204B, and 204C interface with the shelf management processor 206. As is known to the art, a UART receives data from a host processor and converts the data into a serial bit stream having a format that is compatible with a target serial device, such as a terminal. For example, the UART may add start, stop, and parity bits to each character and transmit the character to the terminal at a specified serial data rate. Likewise, serial data that is received at a specified serial data rate from the terminal is converted by the UART into a suitable format by removing the start, stop, and parity bits. The UART may employ common flow control techniques and an internal data buffer to provide efficient communication between the shelf management control processor 206 and the external manager. As shown in FIG. 2, UARTs 204A, 204B, and 204C may be integral to shelf management processor 206 or may be peripheral to shelf management processor 206 and interface with shelf management processor 206 using conventional techniques, such as connection by an address and data bus.

Shelf management processor 206 provides a communication and control interface between an external manager and application cards in the shelf. Shelf management processor 206 may receive a request from an external manager to connect to a particular application card in the shelf assembly. A connection menu generated by shelf management processor 206 may be viewed by the external manager and the connection request may be transmitted to shelf management processor 206 as a menu option selection. The connection menu may include a list of available ports that may be used to establish a connection and may be presented in a source-target format. For example, external management port 202A, 202B, or 202C may be designated as a source port and either rack control interface 212 or shared serial bus interface 214 may be designated as a target port. The connection menu may list each possible source-target combination, or may utilize a two-step approach, with a source port identified in one step and a target port identified in another step. Shelf management processor 206 may also be capable of receiving connection requests from a command line using a predetermined command format.

After receiving a connection request, shelf management processor 206 may determine if the shelf resources needed to complete the connection (i.e., the designated source port and the designated target port) are available. If shelf management processor 206 determines that connection resources are available, shelf management processor 206 may instruct the appropriate application card to attach to a shared serial bus 402, for example by sending a connection command over shelf management interface 208. Shelf management interface 208 may be adapted to connect to management channel 404. Shelf management interface 208 may be implemented using a commercially available chip set, such as Intel's Intelligent Platform Management Interface (IPMI). IPMI, which is based on the inter-integrated circuit ($I^2C$) bus developed by Philips Semiconductors, uses a serial data line and a serial clock line to support communication on management channel 404. Shelf management processor 206 may complete the connection between the appropriate external management port 202A, 202B, or 202C and shared serial bus interface 214 using multiplexer and selector logic 210.

In addition to connecting to a local application card via shared serial bus interface 214, a connection to a shelf manager controller 200 on an adjacent shelf may be established using rack control interface 212. Rack control interface 212 may be connected to a management port 202A, 202C on a shelf management controller 200 residing on an adjacent shelf using an external cable.

Once the connection between external management port 202A, 202B, or 202C, and the target interface (i.e., serial bus interface 214 or rack control interface 212) is established, shelf management processor 206 monitors communications from the external manager to determine when to terminate the connection between the external manager and the target interface. The external manager may initiate the termination of the connection using an in-band command, such as a predetermined escape sequence, by changing the status of one or more hardware interface signals, or both.

FIG. 2 illustrates two application cards 300, each of which may be identically configured to busses 402 and 404. For simplicity, the internal components of one of the application cards are omitted from FIG. 2. In FIG. 2, application card 300 may include an application processor 302, a shelf management interface 304, a UART 306, a shared serial bus interface 308, and control logic 310. Application processor 302 may perform predetermined application functions, such as providing connection and management functions in a telecommunications network. Application processor 302 may also respond to queries through shelf management interface 304, which performs functions complementary to shelf management interface 208. Shelf management interface 304 may communicate with shelf management interface 208 on shelf manager controller 200, including receiving and responding to various status messages. Shelf management interface 304 may be implemented using a commercially available chip set, such as Intel's Intelligent Platform Management Interface (IPMI), and may include a dedicated management controller and interface logic. By using a dedicated management interface, such as IPMI, application processor 302 may be freed from responding to shelf-level management messages. In addition, in the event that application processor 302 ceases to function properly, access to the management functions of application card 300 may still be provided through shelf management interface 304.

UART 306 and shared serial bus interface 308 provide communication capability between application processor 302 and shared serial bus 402. Control logic 310 receives appropriate instructions from shelf management interface 304 to engage or disengage shared serial bus interface 308 from shared serial bus 402. Data received from shared serial bus 402 is reformatted by UART 306 and read by application processor 302 in due course.

In accordance with one embodiment of the subject matter described herein, shelf management card 200 communicates with an application card 300 using a shared serial bus 402. Each application card 300 in a shelf may be connected to shared serial bus 402. Shelf management card 200 and application cards 300 may be configured in a master-slave configuration, with shelf management card 200 acting as the serial bus master.

Figure 3:
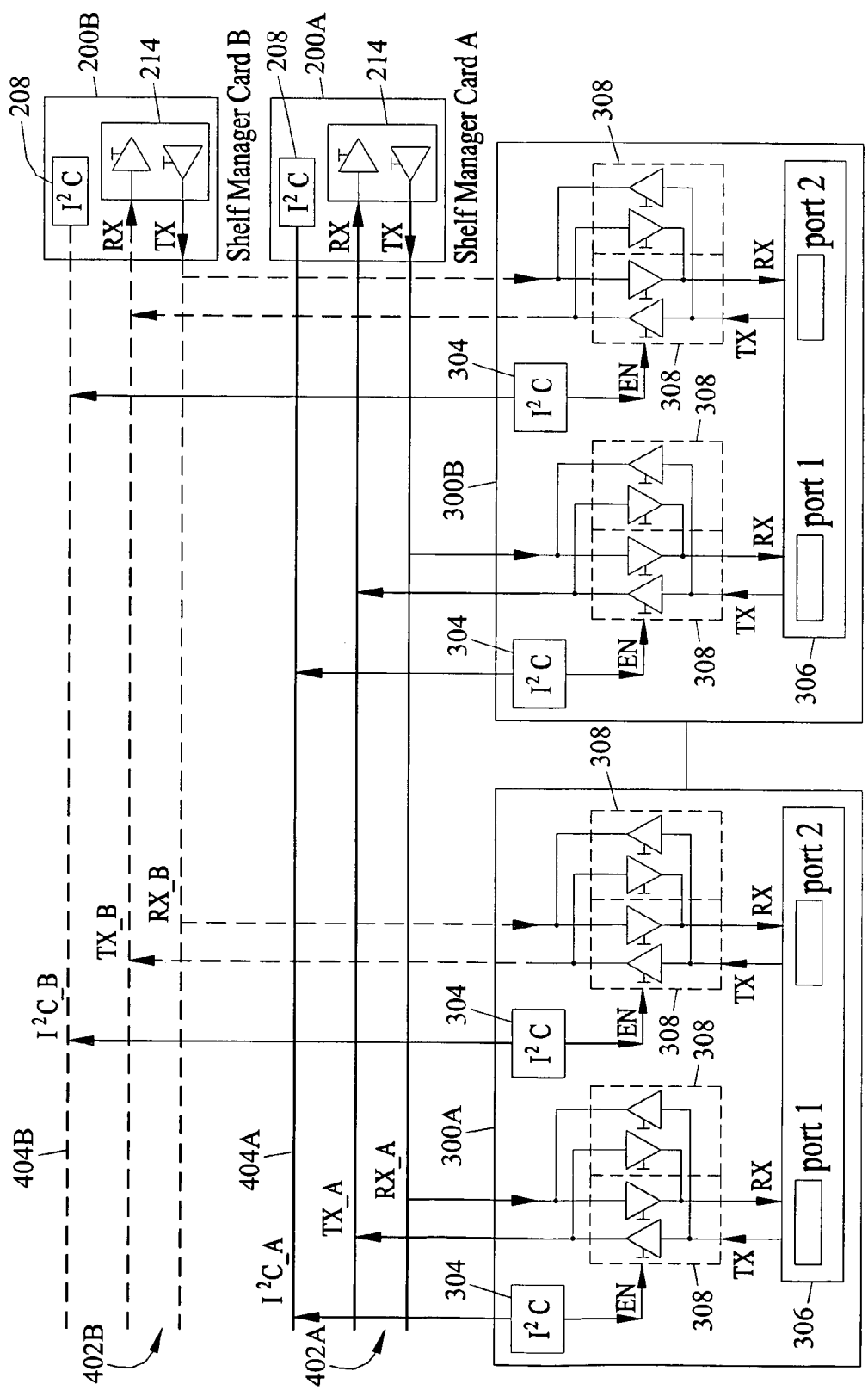
FIG. 3 is a block diagram of an exemplary interface for a shared serial bus in accordance with an embodiment of the subject matter described herein.

FIG. 3 is a block diagram of an exemplary interface for a shared serial bus in accordance with an embodiment of the subject matter described herein. In FIG. 3, each redundant shared serial bus 402A and 402B may be implemented as a balanced, multi-drop transmission line, such as that defined by EIA RS-422 or RS-485. Shelf management card 200A or 200B and each application card 300A and 300B may have a differential transceiver circuit 308 to interface to shared serial bus 402A and 402B. The receiver portion of transceiver circuit 308 of each application card 300A and 300B is connected to the transmitter portion of transceiver circuit 214 of shelf management card 200A and 200B. Likewise, the transmitter portion of transceiver circuit 308 of each application card 300A and 300B is connected to the receiver portion of transceiver circuit 214 of the respective shelf management card 200A and 200B. Each application card 300A and 300B may include provisions to ensure that only one application card is transmitting at a time to prevent bus contention.

Each application card 300A and 300B may include two serial ports for low-level diagnostics, with each serial part being supported by a UART 306. One port may be a diagnostics port and the other may be a console port. The diagnostics port may provide access to diagnostics that are typically used during manufacturing test and may include the ability to access chip-level registers. The console port may provide access to higher-level functions and may be used to set initialization parameters. It is generally not necessary for the operating system to be functioning in order to utilize the console port. The application card 300A and 300B may access the diagnostic port and console port using separate transceivers, or a multiplexer may be used to select the port being connected to the bus 402A and 402B. Each port may support diagnostic and console port functions, thereby providing dual functionality.

As previously noted, only one application card 300A or 300B should transmit on each shared serial bus 402A and 402B at a time. Shelf management card 200A or 200B may instruct the appropriate application card 300A or 300B to transmit on the bus by transmitting a command that includes the identity the target application card 300A or 300B. The command may be transmitted on shared serial bus 402A or 402B and the application card identity may be based on the slot location of the application card 300A or 300B. For example, a unique slot ID may be hard-coded into a midplane connector at each slot location, thereby permitting application card 300A or 300B to determine its slot location in the shelf, even if application card 300A or 300B has limited functionality. Since the receiver portion of transceiver 308 of each application card 300A and 300B can simultaneously access each shared serial bus 402A and 402B, a command sent by the shelf manager card 200A or 200B may be received by each application card 300A and 300B. Each application card 300A and 300B may process the command to determine the intended destination address and ignore the command if it is addressed to another card.

The shelf assembly may also provide a separate management channel 404A and 404B for routing command messages and performing other management functions. Management channel 404A and 404B may be implemented using an IPMI architecture. The IPMI architecture includes a serial data signal and a serial clock signal. A bus master provides the clock signal, although IPMI supports multiple bus masters. Thus, any IPMI interface on an IPMI bus may act as a master to initiate communication with another IPMI interface.

The IPMI architecture may also include a dedicated controller 304 for receiving and processing management commands. Using a dedicated controller 304 to process management commands rather than routing the management commands to application processor 302 provides increased reliability, since management commands can be received and processed even if application processor 302 is not functioning properly. Moreover, the IPMI controller may provide additional services, such as reporting an application processor failure to shelf manager 200A or 200B using management channel 404A and 404B.

Figure 4:
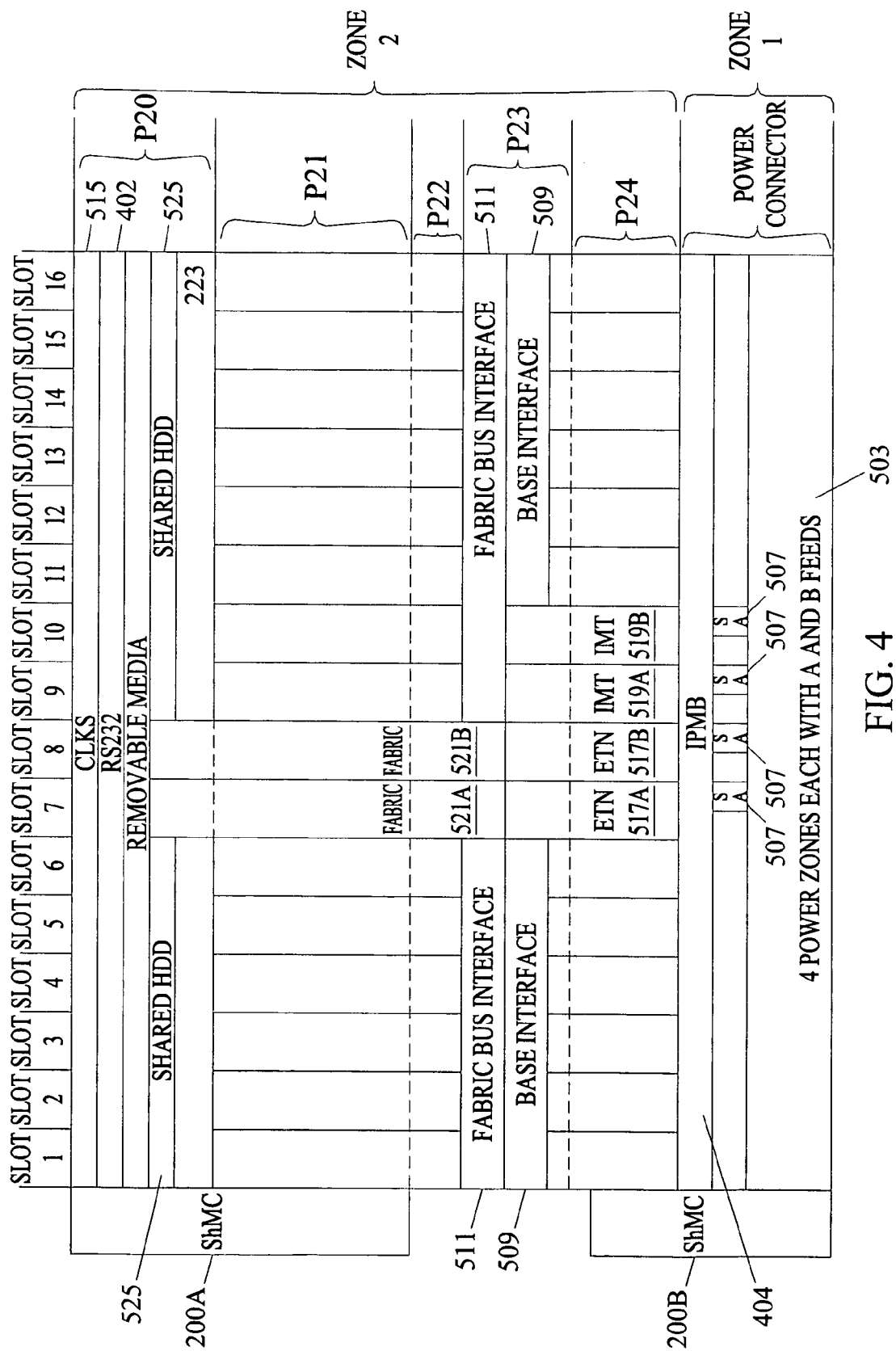
FIG. 4 is a block diagram of a midplane of a PICMG 3.0 compatible shelf assembly in accordance with an embodiment of the subject matter described herein.

FIG. 4 is a block diagram of a midplane of a PICMG 3.0 compatible shelf assembly including a shared serial bus for external diagnostics and console connections in accordance with an embodiment of the subject matter described herein. While the invention is described with reference to a PICMG 3.0 compatible shelf, it should be appreciated that the description of the invention as set forth herein may be applied to other equipment shelf systems. Accordingly, the invention should not be limited to any particular shelf architecture.

Referring to FIG. 4, the shelf assembly provides seventeen card slots arranged in parallel along the midplane. Shelf assemblies typically provide a card slot for a shelf controller and the remaining sixteen slots are available for user devices. The PICMG standard provides for redundant shelf management controller (ShMC) cards 200A and 200B having a management interface to each card slot in the shelf. The ShMC card defined by PICMG is a half-height card, thus both ShMC cards may reside in portions of the same physical slot thereby providing redundancy without reducing the number of available application card slots.

As previously noted, the midplane supports the connectivity for Zone 1 and Zone 2. Zone 1 provides access to a power bus 503 and supports an interface to a management channel 505 from the ShMC to each slot. The power bus 503 may provide access from each slot to at least one power supply. The management channel 404 may be used by various cards in a shelf to obtain initialization information and to conduct management functions, such as card diagnostics. Each card in the shelf may include an intelligent platform management controller (IPMC) that communicates with the ShMC. Zone 1 may also provide a shelf address 507, which may be used in conjunction with other information to identify and/or assign a unique address to each application card in a multi-shelf system.

Zone 2 supports clock and/or data transport across four separate interfaces. These interfaces include a base interface 509, a fabric interface 511, an update channel interface 513, and a synchronization clock interface 515. Base interface 509 may support 10/100/1000Base-T Ethernet connections between application cards in a shelf. Each application node slot may have a single, point-to-point base channel connection to each of two base hub slots 517A and 517B. Base interface 509 may also support other Ethernet-based services, such as Tekelec's proprietary IMT management bus supported by IMT hub cards 519A and 519B.

Fabric interface 511 supports non-Ethernet-based communication between cards. Redundant fabric interface cards 521A and 521B may be provided in the shelf assembly. Each fabric interface card may include configuration information for application cards residing in the remaining card slots, and facilitate non-Ethernet-based communication between application cards. As shown in FIG. 4, redundant fabric interface cards 521A and 521B reside in slot 7 and slot 8. It should be appreciated that non-PICMG compatible shelf architectures may not require the use of fabric interface cards, thus making these slots available for use by application cards.

Update channel interface 513 provides differential signal pairs for communication between slots. The signal pairs may be configured for point-to-point communication between two slots, with a card in one slot transmitting on a first signal pair and the other card transmitting on a second signal pair. In embodiments of the subject matter described herein, one card, such as the ShMC, may be designated as the bus master and the signal pairs may be designated as a transmit pair and a receive pair with respect to the bus master. It should be appreciated that a card other than the ShMC may act as the bus master. For example, if two application cards are communicating using update channel interface 513, one card may be designated the master and an externally accessible console port on the master application card may be used to interface with the other application card. The ShMC may communicate this designation to the application card using management channel 404.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for connecting an externally accessible shared serial port to one of a plurality of target serial ports associated with a plurality of different application cards within a shelf assembly, the method comprising:
   (a) receiving, from an external device connected to an externally accessible shared serial port, a request for a connection between the externally accessible shared serial port and one of a plurality of target serial ports within a shelf assembly associated with a plurality of different application cards, the connection using an internal shared serial bus;
   (b) determining, using an internal communication path different from the internal shared serial bus, whether shelf resources are available to connect the externally accessible shared serial port to the requested target serial port, wherein operation of the internal communication path is independent from operation of an operating system on the application card containing the target serial port; and
   (c) in response to determining that shelf resources are available, connecting the externally accessible shared serial port to the requested target serial port.

2. The method of claim 1 wherein receiving a connection request from the device connected to the externally accessible shared serial port includes receiving a selection from a menu of options.

3. The method of claim 1 wherein receiving a connection request from the device connected to the externally accessible shared serial port includes:
   (a) generating a menu of options based on available resources; and
   (b) receiving a selection from the menu of options.

4. The method of claim 1 wherein receiving a connection request from the device connected to the externally accessible shared serial port includes receiving a non-menu-based connection request indicating the target serial port.

5. The method of claim 1 wherein connecting the externally accessible shared serial port to the requested target serial port includes:
   (a) sending a control command to a controller coupled to the target serial port; and
   (b) in response to the control command, connecting the target serial port to a shared serial bus.

6. The method of claim 5 wherein the control command is sent to the controller coupled to the target serial port using at least one of the internal shared serial bus and the internal communication path different from the internal shared serial bus.

7. The method of claim 1 comprising:
   (a) monitoring the externally accessible shared serial port for a disconnect indicator; and
   (b) in response to receiving the disconnect indicator from the externally accessible shared serial port, disconnecting the externally accessible shared serial port from the requested target serial port.

8. The method of claim 7 wherein monitoring the externally accessible shared serial port for a disconnect indicator includes:
   (a) monitoring a stream of data received from the device connected to the externally accessible shared serial port;
   (b) determining whether the stream of data includes an instruction to disconnect the externally accessible shared serial port from the target serial port; and
   (c) in response to determining that the stream of data includes an instruction to disconnect the externally accessible shared serial port from the target serial port, disconnecting the externally accessible shared serial port from the target serial port.

9. The method of claim 7 wherein monitoring the externally accessible shared serial port for a disconnect indicator includes monitoring control signals from the externally accessible shared serial for a change in connection status.

10. The method of claim 1 wherein the internal communication path different from the internal shared serial bus comprises a management channel.

11. A shelf management interface card comprising:
   (a) at least one communication port adapted to interface with an external management device;
   (b) a processor operatively coupled to the at least one communication port and adapted to receive messages from the external management device;

(c) a shared serial bus interface adapted to interface with an internal shared serial bus for connecting a plurality of application cards to the at least one communication port;

(d) control logic operatively coupled to the processor and adapted to establish a communication pathway between the at least one communication port and the shared serial bus; and (e) an internal management port adapted to interface with an internal management channel for communicating commands and status information between the shelf management interface card and another a target card, wherein operation of the internal management channel is independent from operation of an operating system on the target card.

12. The shelf management interface card of claim 11 wherein the at least one communication port supports serial communication with the external management device.

13. The shelf management interface card of claim 11 wherein the processor is adapted to provide a connection menu to the external management device and receive a message indicating a connection chosen from the connection menu.

14. The shelf management interface card of claim 11 wherein communicating commands and status information between the shelf management interface card and another card includes determining whether the other card is capable of being connected to the shared serial bus.

15. The shelf management interface card of claim 11 wherein communicating commands and status information between the shelf management interface card and another card includes configuring the other card to connect to or disconnect from the shared serial bus.

16. A shelf management system comprising:

(a) a first card including a console port adapted to interface with an external management device and including a management port adapted to interface with an internal management channel;

(b) a second card including a serial port, an application processor, and a management port adapted to interface with the internal management channel, wherein operation of the management port is independent from operation of an operating system on the second card; and (c) a shared serial bus, different from the internal management channel, adapted to interface with the console port on the first card and the serial port on the second card and providing a data transport path therebetween.

17. The shelf management system of claim 16 wherein the first card is a shelf management card and the second card is an application card.

18. The shelf management system of claim 16 wherein the first card is a first application card and the second card is a second application card.

19. The shelf management system of claim 16 wherein at least one of the shared serial bus and the internal management channel is implemented in a mid plane of a shelf assembly.

20. The shelf management system of claim 16 wherein the console port is coupled to a processor adapted to provide a connection menu.

21. The shelf management system of claim 16 wherein the console port is coupled to a processor adapted to receive a connection request.

22. The shelf management system of claim 16 comprising at least one third card including a serial port and an application processor, the serial port being coupled to the shared serial bus and wherein the console port is adapted to provide selective access to the serial ports on the second and third cards via the shared serial bus.

23. The shelf management system of claim 16 wherein the internal management channel is used to determine whether the serial port on the second card is capable of being connected to the shared serial bus.

24. The shelf management system of claim 16 wherein the internal management channel is used to configure the serial port on the second card to connect or disconnect from the shared serial bus.

* * * * *

UNITED STATES PATENT AND TRADEMARK OFFICE
CERTIFICATE OF CORRECTION

PATENT NO. : 7,644,215 B2  
APPLICATION NO. : 11/272478  
DATED : January 5, 2010  
INVENTOR(S) : Wallace et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 651 days.

Signed and Sealed this

Sixteenth Day of November, 2010

David J. Kappos  
*Director of the United States Patent and Trademark Office*